Patented Jan. 13, 1953

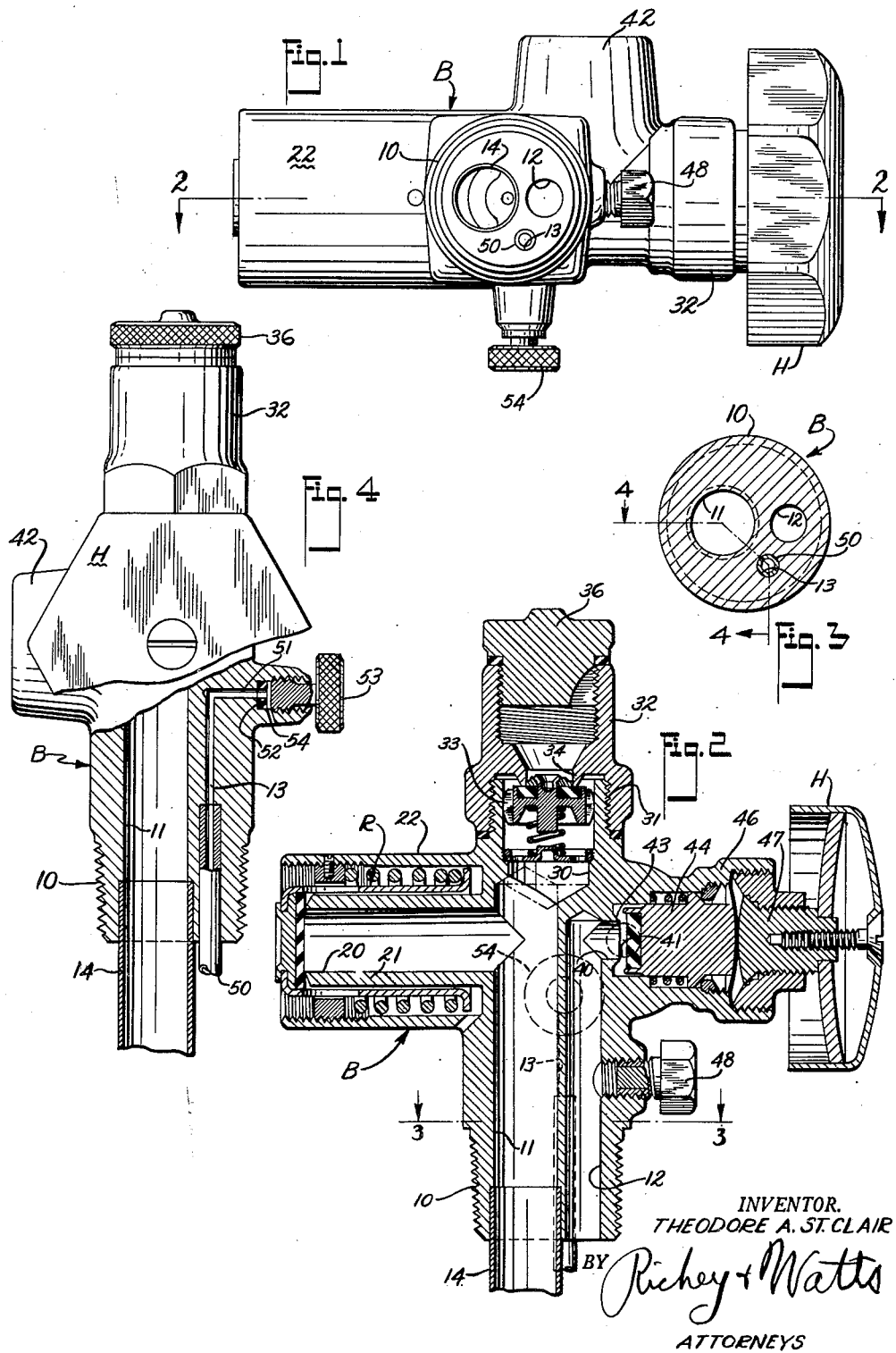

2,625,016

UNITED STATES PATENT OFFICE 2,625,016

MULTIPLE VALVE ASSEMBLY

Theodore A. St. Clair, Cleveland, Ohio, assignor to The Weatherhead Company, Cleveland, Ohio, a corporation of Ohio Application December 15, 1949, Serial No. 133,126

2 Claims. (Cl. 62—1)

This invention relates to valves and, more particularly, to valves in connection with dispensing of liquid petroleum and other gases. Valves of the type to which this invention relates must provide for the filling and dispensing from a tank of liquid gases and for testing the liquid level in the tank. They must also be arranged to provide for a relief valve to relieve excess pressure in the tank.

This has necessitated a rather complicated valve structure and prior valves have required difficult and expensive machining operations to provide the necessary inlets and outlets and fittings. It is an object of the present invention to provide a valve of the nature described which is compact, has a small radial dimension, and a one-piece body readily formed by simple drilling operations.

Another object is to permit forming a fill chamber, vapor chamber, and filling gauge tube chamber by drilling from one end of the body and a fill valve chamber by drilling from the other end. A valve formed in accordance with the invention is simple in structure and is readily and economically machined, and in addition it eliminates the need for threads or other attaching means at the other end of the fill chamber for the dip tube, which tube (in applicant's valve) may be connected directly to the outer end of the filling bore.

Briefly, these objects are accomplished by providing a body having an axial nipple formed with means for connection to the tank which has three eccentric bores therein, each of which connects with a radial bore and one of which, the fill bore, intersects an axial fill valve bore drilled from the opposite end of the body.

The manner in which these objects and advantages can be attained will be understood from the following detailed description of a preferred embodiment of the invention.

In the drawings:

Fig. 1 is a bottom view of the valve;

Fig. 2 is a section taken on 2—2 of Fig. 1;

Fig. 3 is a transverse section through the mounting nipple; and,

Fig. 4 is a partial section taken on 4—4 of Fig. 3.

Referring to the drawings, the valve body B is a simple one-piece casting or forging that has an axially extending threaded nipple 10 for attachment to the storage tank and drilled from the inner end of the body in nipple 10 are three axial bores eccentric with the nipple. Bore 11, which is preferably the largest bore, is arranged to provide for the filling of the tank with liquefied gas under pressure. Bore 12 is a vapor dispensing bore and bore 13 is for the gauge tube or liquid level testing means. Bore 11 may have brazed or soldered to its axially outer wall portion the liquid dip tube 14. At the inner or upper portion of bore 11 a bore 20 intersects bore 11, bore 20 being drilled in a sleeve 21 formed as part of the body which is concentric with the outer sleeve 22, the sleeves cooperating to mount suitable relief valve assembly R. Details of the relief valve assembly form no part of the invention, structure suitable for the purpose being described in the copending application of Andrew G. Johnson, Serial No. 785,939, filed November 14, 1947.

In order to provide for the filling of the tank with liquid, an axial bore 30 is drilled from the other or upper end of the valve and intersects bore 11. Bore 30 is formed in an axially outwardly extending nipple 31 to which is threaded a member 32 forming part of the fill valve structure. The details of the filling check valve form no part of the invention, suitable structure being well known in the art it being understood that a spring-loaded check valve 33 rides within nipple 31 and cooperates with valve seat 34 formed on member 32. A closure and dust cap 36 may be provided to protect the fill valve mechanism.

Means are provided for the dispensing of gas from bore 12. The radial bore 40 is formed in the body intersecting bore 12 which leads to a radial outlet bore 41 formed in outlet nipple 42. Bore 40 is surrounded by the valve seat 43 which may be engaged by a movable valve member 44 mounted in the radial nipple 46. The valve controlling assembly shown is what is known as a packless valve type and is operated by a threaded valve button 47 to which is fastened a handle H. Details of the valve operating mechanism are known in the art and form no part of the invention.

The other eccentric bore and nipple 10, which is bore 13, is intersected by a radial bore 51 formed in the body which is surrounded by a valve disc 52 of rubber-like material. It may be engaged under manual manipulation by a valve member 53 for opening or closing a tell-tale port 54 from communication with liquid forced into the gauge tube 50 and up bore 13. Details of the fill gauge valve construction are not critical to the invention, suitable constructions for the valve being described in the pending applications of Paul Guth, Serial No. 788,126, filed November 26, 1947, and Andrew G. Johnson, Serial No. 94,383, filed May 20, 1949.

It can be seen that it is characterized by a compact construction wherein three bores are formed eccentrically in the nipple 10 by simple endwise drilling operations, each bore being intersected by a radial bore for dispensing, testing or relief pressure, and one bore (the fill bore) being intersected by an axial bore drilled from the other end to provide for the filling of the tank with liquid.

It will be noted that both dip and gauge tubes 14 and 15 are readily attached by simple soldering or brazing operations directly to the lower zone of their respective bores. Thus, a relatively complex valve assembly, when formed in accordance with applicant's invention, is readily adaptable to mass production and employs many economically formed drilling operations, nor are any internal tube attaching means or internal connecting tubes between bores or ports required.

Having completed a detailed description of a preferred form of the invention it will be apparent that other forms thereof may be provided without departing from the essence of the invention as defined in the appended claims.

What is claimed is:

1. A fitting for dispensing liquefied gas under pressure comprising a unitary body having a midsection, an elongated first nipple extending axially from said midsection, means on said first nipple for mounting the fitting on a tank, a first bore in said first nipple and body midsection on the axis of said bore being substantially parallel with and eccentric to the axis of said first nipple, a tube extending from the outer end of said first eccentric bore, a sleeve extending generally radially from said body midsection, a first passageway in said sleeve intersecting said first eccentric bore, a valve in said sleeve, a second eccentric bore in said first nipple and body midsection and having an end wall, a second nipple extending generally radially from said body midsection, a second passageway in said second nipple intersecting said second eccentric bore, a valve in said second nipple, a third eccentric bore in said first nipple, a fill gauge tube extending from said third eccentric bore, a third passageway in said body intersecting said third eccentric bore, a valve for said third passageway, a third nipple extending from said body midsection in axial alignment with said first nipple, a fourth bore centered in said third nipple and intersecting said first eccentric bore, a valve in said fourth bore, a portion of the end wall of said second eccentric bore also forming a partial end wall of said fourth bore.

2. A fitting for dispensing liquefied gas under pressure comprising a unitary body having a midsection, an elongated first nipple extending axially from said midsection, means on said first nipple for mounting the fitting on a tank, a first bore in said first nipple and body midsection the axis of said bore being substantially parallel with and eccentric to the axis of said first nipple, a fill tube extending from the outer end of said first eccentric bore, a sleeve extending generally radially from said body midsection, a first passageway in said sleeve intersecting said first eccentric bore, a relief valve in said sleeve, a second eccentric bore in said first nipple and body midsection and having an end wall, a second nipple extending generally radially from said body midsection, a second passageway in said second nipple intersecting said second eccentric bore, a vapor dispensing valve in said second nipple, a third eccentric bore in said first nipple, a fill gauge tube extending from said third eccentric bore, a third passageway in said body intersecting said third eccentric bore, a valve for said third passageway, a third nipple extending from said body midsection in axial alignment with said first nipple, a fourth bore centered in said third nipple and intersecting said first eccentric bore, a fill check valve in said fourth bore, a portion of the end wall of said second eccentric bore also forming a partial end wall of said fourth bore.

THEODORE A. ST. CLAIR.

REFERENCES CITED

The following references are of record in the file of this patent:

UNITED STATES PATENTS

| Number | Name | Date |
|---|---|---|
| 2,121,675 | White | June 21, 1938 |
| 2,307,309 | Thomas | Jan. 5, 1943 |
| 2,341,579 | Sundstrom | Feb. 15, 1944 |
| 2,449,119 | Holicer | Sept. 14, 1948 |
| 2,456,913 | Buttner et al. | Dec. 21, 1948 |